US011200046B2

(12) United States Patent
Bower, III et al.

(10) Patent No.: US 11,200,046 B2
(45) Date of Patent: Dec. 14, 2021

(54) MANAGING COMPOSABLE COMPUTE SYSTEM INFRASTRUCTURE WITH SUPPORT FOR DECOUPLED FIRMWARE UPDATES

(71) Applicant: LENOVO ENTERPRISE SOLUTIONS (SINGAPORE) PTE. LTD., Singapore (SG)

(72) Inventors: Fred A. Bower, III, Durham, NC (US); Caihong Zhang, Shanghai (CN)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 94 days.

(21) Appl. No.: 16/660,397

(22) Filed: Oct. 22, 2019

(65) Prior Publication Data

US 2021/0117181 A1   Apr. 22, 2021

(51) Int. Cl.
| | |
|---|---|
| *G06F 9/44* | (2018.01) |
| *G06F 8/656* | (2018.01) |
| *G06F 8/658* | (2018.01) |
| *G06F 12/1081* | (2016.01) |
| *G06F 9/4401* | (2018.01) |
| *G06F 9/50* | (2006.01) |
| *G06F 9/48* | (2006.01) |
| *G06F 9/455* | (2018.01) |

(Continued)

(52) U.S. Cl.
CPC .............. *G06F 8/656* (2018.02); *G06F 8/658* (2018.02); *G06F 9/4418* (2013.01); *G06F 9/45558* (2013.01); *G06F 9/4856* (2013.01); *G06F 9/5027* (2013.01); *G06F 9/5066* (2013.01); *G06F 9/5088* (2013.01); *G06F 12/1081* (2013.01); *G06F 3/0673* (2013.01); *H04L 41/12* (2013.01)

(58) Field of Classification Search
CPC .... G06F 9/5027; G06F 9/5088; G06F 3/0673; G06F 8/65; G06F 8/658; G06F 11/3409; G06F 11/2028; G06F 11/2038; G06F 9/4418; G06F 9/4856; G06F 9/5066; G06F 9/45558; G06F 8/656; G06F 12/1081; H04L 45/00; H04L 41/12
See application file for complete search history.

(56) References Cited

U.S. PATENT DOCUMENTS

| | | | |
|---|---|---|---|
| 2011/0296052 A1* | 12/2011 | Guo | ........................ H04L 45/00 709/240 |
| 2012/0151248 A1* | 6/2012 | Bower, III | .......... G06F 11/2038 714/4.11 |

(Continued)

*Primary Examiner* — Tuan A Vu

(57) ABSTRACT

Managing composable compute system infrastructure with support for decoupled firmware updates includes mapping a device to a server, wherein the device is in a resource pool of devices including at least one idle device, and wherein the device and the server are within a pod of composable compute elements connected by a fabric in a composable system executing a workload; detecting that the device has a needed firmware update; exchanging, transparent to the workload executing in the composable system, the mapping for the device with the needed firmware update and the idle device in the resource pool; and performing the firmware update on the unmapped device as the workload executes in the composable system with the newly mapped device.

20 Claims, 7 Drawing Sheets

(51) Int. Cl.
    *G06F 3/06*          (2006.01)
    *H04L 12/24*       (2006.01)

(56) References Cited

U.S. PATENT DOCUMENTS

| | | | | |
|---|---|---|---|---|
| 2013/0019072 | A1* | 1/2013 | Strasser | G06F 3/0673 |
| | | | | 711/154 |
| 2015/0317222 | A1* | 11/2015 | Mahindru | G06F 11/2028 |
| | | | | 714/4.11 |
| 2016/0004528 | A1* | 1/2016 | Price | G06F 8/65 |
| | | | | 717/173 |
| 2016/0020965 | A1* | 1/2016 | Sakata | G06F 11/3409 |
| | | | | 714/4.12 |
| 2016/0283221 | A1* | 9/2016 | Kochar | G06F 9/45558 |
| 2016/0328257 | A1* | 11/2016 | Hudzia | G06F 9/5088 |
| 2019/0068698 | A1* | 2/2019 | Kumar | G06F 9/5088 |
| 2019/0379731 | A1* | 12/2019 | Johnsen | G06F 9/5027 |
| 2020/0241903 | A1* | 7/2020 | Wang | H04L 41/12 |
| 2020/0249928 | A1* | 8/2020 | Zeng | G06F 8/658 |

\* cited by examiner

MANAGING COMPOSABLE COMPUTE SYSTEM INFRASTRUCTURE WITH SUPPORT FOR DECOUPLED FIRMWARE UPDATES

BACKGROUND

Field of the Invention

The field of the present disclosure is data processing, or, more specifically, methods, apparatus, and products for managing composable compute systems with support for decoupled firmware updates.

Description Of Related Art

In current computing environments, firmware updates require a system restart or reboot to initialize the new firmware elements with the rest of the software. Rebooting takes several minutes and requires scheduling workloads around the downtime to avoid interruption. This makes the process of updating and activating new firmware difficult to schedule and expensive.

SUMMARY

Methods, systems, and apparatus for managing composable compute system infrastructure with support for decoupled firmware updates are disclosed in this specification. Managing composable compute system infrastructure with support for decoupled firmware updates includes mapping a device to a server, wherein the device is in a resource pool of devices including at least one idle device, and wherein the device and the server are within a pod of composable compute elements connected by a fabric in a composable system executing a workload; detecting that the device has a needed firmware update; exchanging, transparent to the workload executing in the composable system, the mapping for the device with the needed firmware update and the idle device in the resource pool; and performing the firmware update on the unmapped device as the workload executes in the composable system with the newly mapped device.

The foregoing and other objects, features and advantages of the disclosure will be apparent from the following more particular descriptions of exemplary embodiments of the present disclosure as illustrated in the accompanying drawings wherein like reference numbers generally represent like parts of exemplary embodiments of the present disclosure.

DETAILED DESCRIPTION

Figure 1:
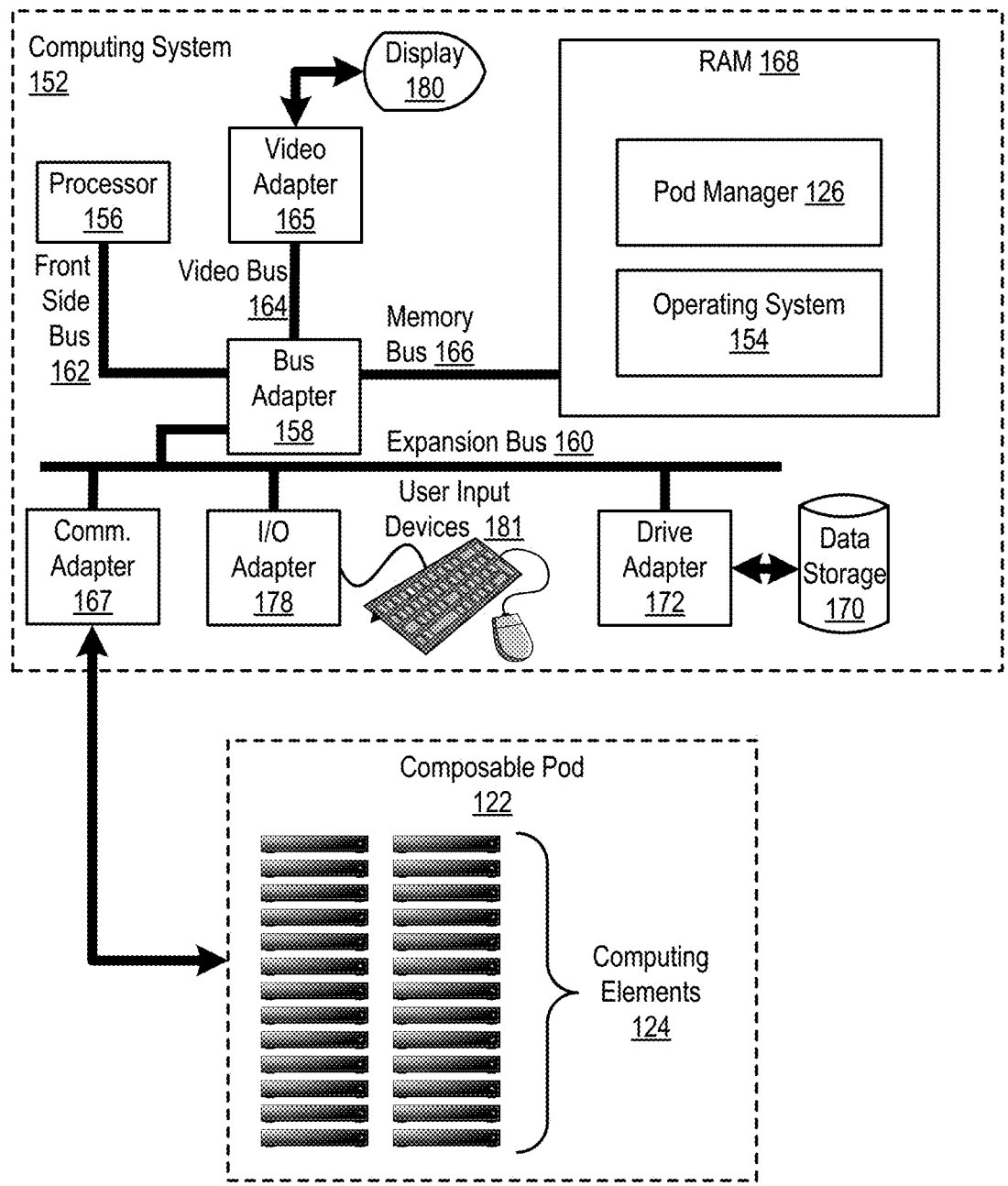
FIG. 1 sets forth a block diagram of an example system configured for managing composable compute system infrastructure with support for decoupled firmware updates according to embodiments of the present disclosure.

Exemplary methods, apparatus, and products for managing composable compute system infrastructure with support for decoupled firmware updates in accordance with the present disclosure are described with reference to the accompanying drawings, beginning with FIG. 1. FIG. 1 sets forth a block diagram of automated computing machinery comprising an exemplary computing system (152) configured for managing composable compute system infrastructure with support for decoupled firmware updates according to embodiments of the present disclosure. The computing system (152) of FIG. 1 includes at least one computer processor (156) or "CPU" as well as random access memory (168) ("RAM") which is connected through a high speed memory bus (166) and bus adapter (158) to processor (156) and to other components of the computing system (152).

Stored in RAM (168) is an operating system (154). Operating systems useful in computers configured for managing composable compute system infrastructure with support for decoupled firmware updates according to embodiments of the present disclosure include UNIX™, Linux™, Microsoft Windows™, AIX™, IBM's iOS™, and others as will occur to those of skill in the art. The operating system (154) in the example of FIG. 1 is shown in RAM (168), but many components of such software typically are stored in non-volatile memory also, such as, for example, on a disk drive (170). Also stored in RAM (168) and part of the operating system is a pod manager (126), a module of computer program instructions for managing composable compute system infrastructure with support for decoupled firmware updates.

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of disk drive (170). Disk drive adapters useful in computers configured for managing composable compute system infrastructure with support for decoupled firmware updates according to embodiments of the present disclosure include Integrated Drive Electronics ("IDE") adapters, Small Computer System Interface ("SCSI") adapters, and others as will occur to those of skill in the art. Non-volatile computer memory also may be implemented for as an optical disk drive, electrically erasable programmable read-only memory (so-called "EEPROM" or "Flash" memory), RAM drives, and so on, as will occur to those of skill in the art.

The example computing system (152) of FIG. 1 includes one or more input/output ("I/O") adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (165), which is an example of an I/O adapter specially designed for graphic output to a display device (180) such as a display screen or computer monitor. Video adapter (165) is connected to processor (156) through a high speed video bus (164), bus adapter (158), and the front side bus (162), which is also a high speed bus.

The exemplary computing system (152) of FIG. 1 includes a communications adapter (167) for data communications with other computers (182) and for data communications with a data communications network. Such data communications may be carried out serially through RS-232 connections, through external buses such as a Universal Serial Bus ("USB"), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for managing composable compute system infrastructure with support for decoupled firmware updates according to embodiments of the present disclosure include modems for wired dial-up communications, Ethernet (IEEE 802.3) adapters for wired data communications, and 802.11 adapters for wireless data communications.

The communications adapter (167) of the exemplary computing system (152) of FIG. 1 is connected to a composable pod (122) via a communications bus. The composable pod (122) is a collection of computing elements (124) able to be arranged (i.e., composable) into different configurations based on the data center requirements. Examples of computing elements (124) include compute nodes, memory, accelerators including GPUs and FPGAs, communications adapters, I/O adapters, drive adapters, and storage devices such as platter drives and solid state drives. The composable pod (122) may be a set of computing elements configured based on Intel's Rack Scale Design platform.

Figure 2:
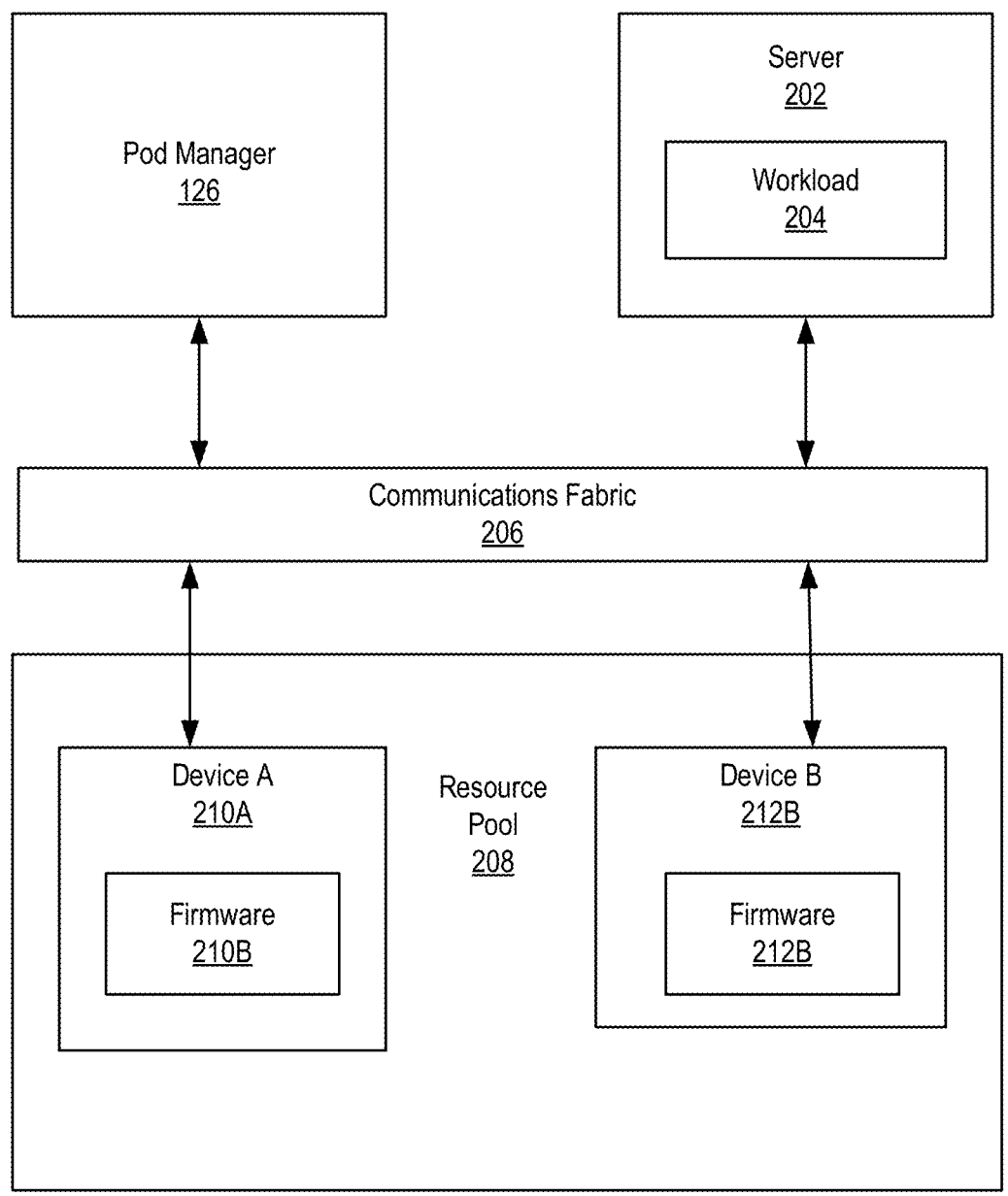
FIG. 2 sets forth a block diagram for managing composable compute system infrastructure with support for decoupled firmware updates according to embodiments of the present disclosure.

FIG. 2 is an example block diagram of a system configured for managing composable compute system infrastructure with support for decoupled firmware updates. FIG. 2 includes a pod manager (126) and a composable pod (122). The composable pod (122) includes a server (202) coupled to a resource pool (208) via a communications fabric (206). The server includes a workload (204). The resource pool (208) includes two devices (device A (210A) and device B (210B)). Device A (210A) includes firmware (212A) and device B (210B) includes firmware (212B). The pod manager (126) communicates with server (202) and device A (210A) and device B (210B). Although FIG. 2 shows the server and resource pool in one particular configuration, other combinations of additional servers, not shown, and resource pools and devices are possible.

The pod manager (126) is software, hardware, or an aggregation of both software and hardware that composes and manages composable systems. The pod manager (126) issues instructions, including instructions configuring the composition of the servers (server (202) and others not shown) and resource pool (208) and others not shown within the composable pod (122) (e.g., by mapping or unmapping devices to or from the servers).

The server (202) is a collection of one or more computing elements that may be housed in an enclosure or enclosures and configured to host at least one workload (204). A workload is a process or group of processes that performs a function using data stored on data drives. For example, a workload may model complex systems, such as weather forecasting using a weather modeling application and weather data. Workloads may be isolated applications, virtual machines, hypervisors, or another group of processes that work together, using data on a data drive or disk drives, to perform a function.

The communications fabric (206) is a device or group of devices that transfers data between computing components in the composable pod (122). The communications fabric (206) may be a switching fabric such as a Peripheral Component Interconnect Express (PCIe), Infiniband, Omni-Path, or Ethernet network. The communications fabric (206) may be Remote Direct Memory Access (RDMA) capable. The communications fabric (206) may communicate directly with server (202) and devices (device A (210A) and device B (210B)) or may communicate with enclosures, controllers, or adapters in communication with server (202) and devices (device A (210A) and device B (210B)).

The resource pool (208) includes devices (device A (210A) and device B (210B)) that may be housed in an enclosure or enclosures and are devices used to execute one or more workloads. Devices (device A (210A) and device B (210B)) may be memory, accelerators including GPUs and FPGAs, communications adapters, I/O adapters, drive adapters, and storage devices such as platter drives and solid state drives. Data drives may be physical drives, or virtual drives made up of a portion of a physical drive or a group of physical drives. The resource pool (208) may include more devices, not shown, and preferably at least one idle device.

Updating device firmware (firmware 212A and firmware 212B) requires reinitialization. Existing solutions require restarting the system in order to initialize the new firmware elements with the rest of the system software. Virtualization techniques have been employed, as an alternative, to perform rolling updates. In a rolling update, the workload is moved between hosts via virtual machine motion. The update is non-interruptive but requires that the system maintains enough excess capacity to enable the evacuation of an entire node in the cluster. The rolling update also requires a slowdown of the workload while it is migrated. That is, there is a period of time where the workload is non-responsive while it is quiesced, moved, and restarted on a secondary node which can last for minutes or longer.

In a composable system, system resources are composed at runtime across a shared fabric. An enclosure provides power, cooling, management, and connectivity to the communications fabric. The compute resources can be dynamically connected via fabric configuration to any of the other compute resources in the sharing domain. When a firmware update is required, the active mapping connecting the resource to be updated to the communications fabric is changed to an idle resource that is available in the pool of resources. The resource is updated and then may be returned to the pool of resources or may be remapped to the original mapping.

Figure 3:
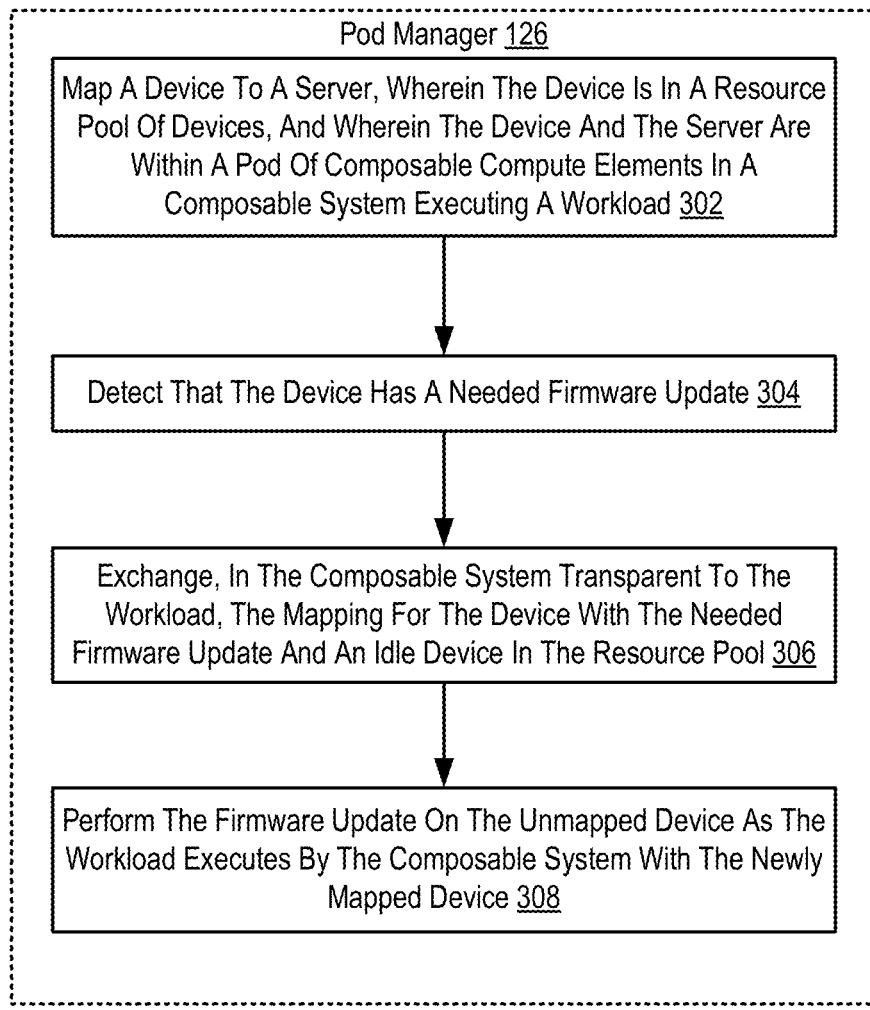
FIG. 3 sets forth a flow chart illustrating an exemplary method for managing composable compute system infrastructure with support for decoupled firmware updates according to embodiments of the present disclosure.

For further explanation, FIG. 3 sets forth a flow chart illustrating an exemplary method for managing composable compute system infrastructure with support for decoupled firmware updates according to embodiments of the present disclosure. The method of FIG. 3 includes mapping (302) a device to a server, wherein the device is in a resource pool of devices, and wherein the device and the server are within a pod of composable compute elements in a composable system executing a workload. Mapping (302) a device to a server, wherein the device is in a resource pool of devices, and wherein the device and the server are within a pod of composable compute elements in a composable system executing a workload may be carried out by connecting a device within a resource pool in an enclosure to a server via configuration messages sent from the pod manager to the communications fabric connecting the composed elements. Such messages may be sent from the pod manager to a controller or an adapter within the communications fabric connecting composable elements of the composable pod. The device driver settings on the server are initialized at setup and remain unchanged by mapping the device to the server by the pod manager.

The composable system executes a workload, for example, a processing job that includes data and an application in which the data is processed according to the application. Executing a workload may include contributions from more than one compute element in the composed system. The involvement of each compute element may increase or decrease depending upon the current requirements of the workload execution. During some periods of the execution of the workload, certain compute elements may be heavily utilized or lightly utilized. Further, during certain periods of the execution of the workload, certain compute elements may be in an idle or stable state.

FIG. 3 also includes detecting (304) that the device has a needed firmware update. Detecting (304) that the device has a needed firmware update may be carried out by comparing the current version of firmware for the device with the available version of the firmware, for example. If the available version of the firmware (212A) is greater than the version currently used by the device A (210A), then the firmware (212A) for the device A (210A) may need an update. The pod manager (126) or another controller may track or be notified of current and available firmware versions.

FIG. 3 also includes exchanging (306), in the composable system transparent to the workload, the mapping for the device with the needed firmware update and an idle device in the resource pool. Exchanging (306), in the composable system transparent to the workload, the mapping for the device with the needed firmware update and an idle device in the resource pool may be carried out by sending instructions from the pod manager (126) to the communication fabric or a controller or adapters in the communication fabric to update the address of device A (210A) and device B (210B). The device drivers on the server (202) remain unchanged and the device mapping is transparent to the server (202) and the executing workload (204).

The communication fabric may be RDMA capable ethernet, including a controller or controllers or adapters for each device. The address for each device may be updated with a new address in the space of several clock cycles. The address of an idle device B (210B) is updated to be mapped to server (202) while the address of device A (210A) is also updated. The address of device A (210A) may be updated to an unused address, an idle address, or a default address. Preferably, the addresses for device A (210A) and device B (210B) are updated while device A (210A) is stable. Alternatively, instructions or messages sent to device A (210A) are queued while device B (210B) is being mapped. The change in mapping is transparent to the server (202) and workload (204). That is, workload (204) executes on server (202) using compute elements as required. The exchange of mapping from device A (210A) to device B (210B) happens transparently and without interrupting the execution of workload (204). The exchange of mapping occurs instantaneously or in the space of clock cycles rather than the minutes that a rolling update, including evacuating and migrating an entire node, would require in a virtualized system.

FIG. 3 also includes performing (308) the firmware update on the unmapped device as the workload executes by the composable system with the newly mapped device. Performing (308) the firmware update on the unmapped device as the workload executes by the composable system with the newly mapped device may be carried out by pausing or quiescing device A (210A) and updating firmware (212A). During the time when firmware (212A) is updating, the workload (204) executes on server (202) and device B (210B).

Figure 4:
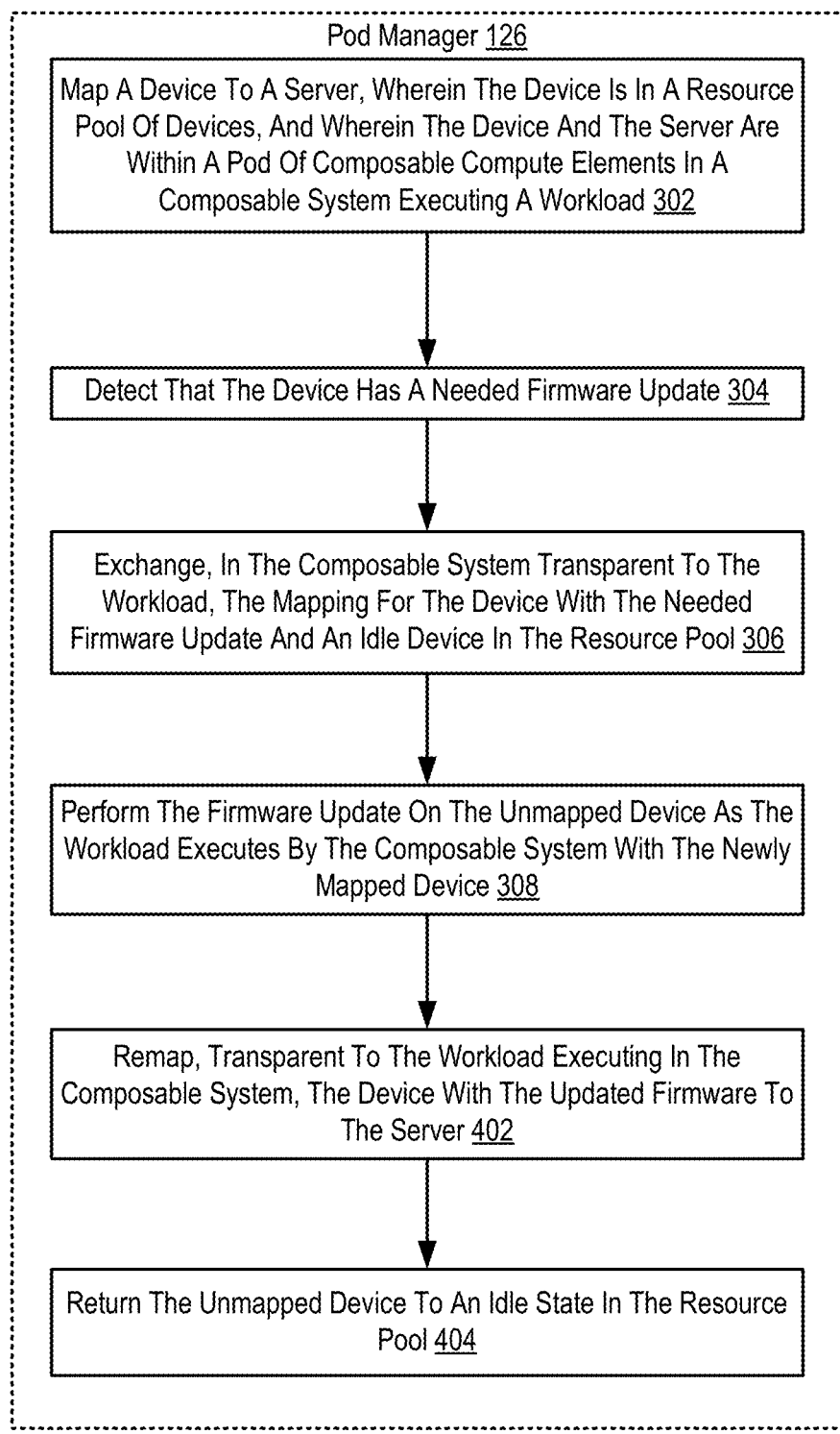
FIG. 4 sets forth a flow chart illustrating an exemplary method for managing composable compute system infrastructure with support for decoupled firmware updates according to embodiments of the present disclosure.

For further explanation, FIG. 4 sets forth a flow chart illustrating an exemplary method for managing composable compute system infrastructure with support for decoupled firmware updates according to embodiments of the present disclosure that includes mapping (302) a device to a server, wherein the device is in a resource pool of devices including at least one idle device, and wherein the device and the server are within a pod of composable compute elements connected by a fabric in a composable system executing a workload; detecting (304) that the device has a needed firmware update; exchanging (306), transparent to the workload executing in the composable system, the mapping for the device with the needed firmware update and the idle device in the resource pool; and performing (308) the firmware update on the unmapped device as the workload executes in the composable system with the newly mapped device.

The method of FIG. 4 differs from the method of FIG. 3, however, in that after performing (308) the firmware update on the unmapped device as the workload executes in the composable system with the newly mapped device, the method also includes remapping (402), transparent to the workload executing in the composable system, the device with the updated firmware to the server. Remapping (4020), transparent to the workload executing in the composable system, the device with the updated firmware to the server may be carried out by sending instructions from the pod manager (126) to the communication fabric or a controller or adapters in the communication fabric to update the address of device A (210A). Preferably, the address for device A (210A) is remapped while device B (210B) is stable. Alternatively, instructions or messages sent to device B (210B) are queued while device A (210A) and device B (210B) are being remapped. The change in mapping is transparent to the server (202) and workload (204). That is, workload (204) executes on server (202) using compute elements as required. The remapping of device A (210A) from device B (210B) happens transparently and without interrupting the execution of workload (204). The device drivers on the server (202) remain unchanged and the device mapping is transparent to the server (202) and the executing workload (204).

The method of FIG. 4 also differs from the method of FIG. 3, in that FIG. 4 includes returning (404) the unmapped device to an idle state in the resource pool. Returning (404) the unmapped device to an idle state in the resource pool may be carried out by sending instructions from the pod manager (126) to the communication fabric or a controller or adapters in the communication fabric to update the address of device B (210B). The address of device B (210B) may be updated to an unused address, an idle address, or a default address. As workload (204) executes on server (202) and device A (210A), device B (210B) returns to an idle state.

Figure 5:
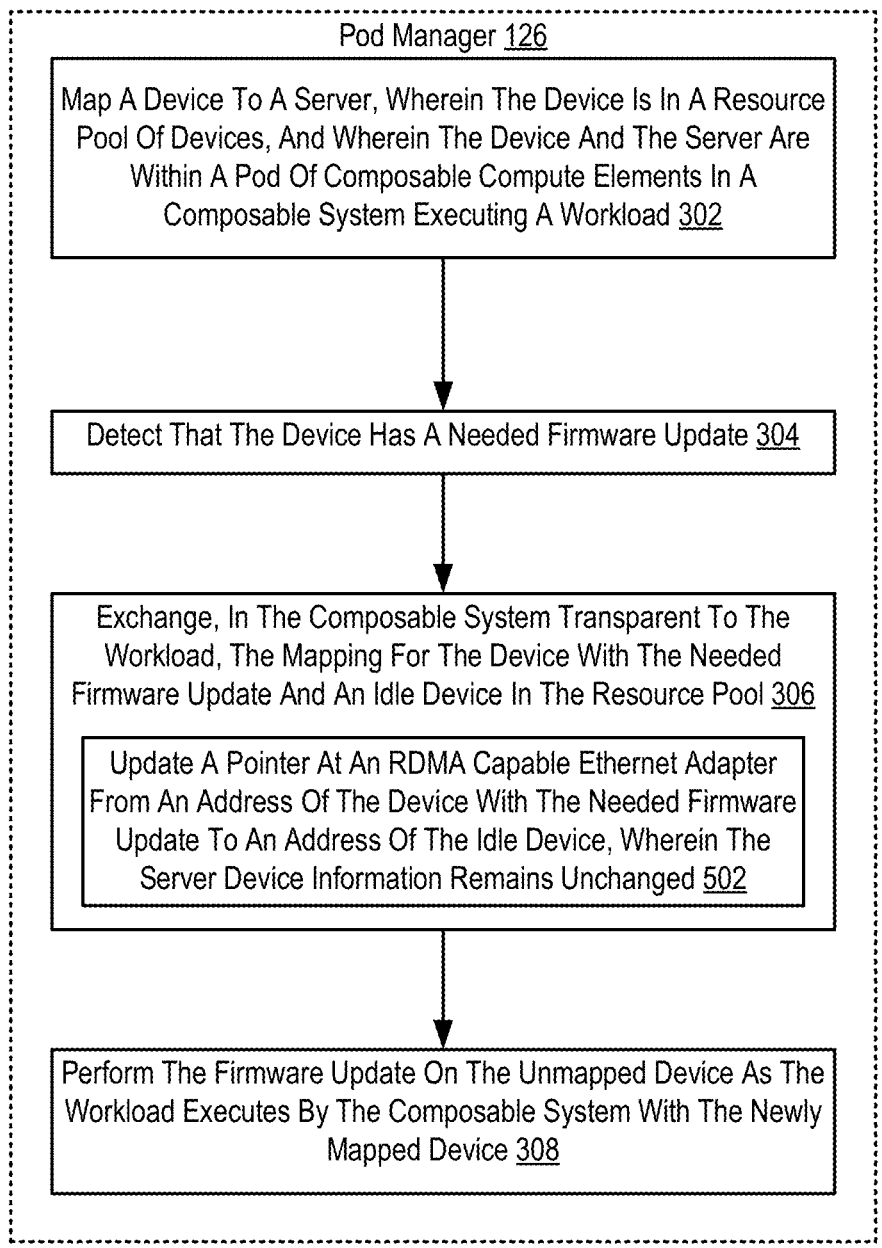
FIG. 5 sets forth a flow chart illustrating an exemplary method for managing composable compute system infrastructure with support for decoupled firmware updates according to embodiments of the present disclosure.

For further explanation, FIG. 5 sets forth a flow chart illustrating an exemplary method for managing composable compute system infrastructure with support for decoupled firmware updates according to embodiments of the present disclosure that includes mapping (302) a device to a server, wherein the device is in a resource pool of devices including at least one idle device, and wherein the device and the server are within a pod of composable compute elements connected by a fabric in a composable system executing a workload; detecting (304) that the device has a needed firmware update; exchanging (306), transparent to the workload executing in the composable system, the mapping for the device with the needed firmware update and the idle device in the resource pool; and performing (308) the firmware update on the unmapped device as the workload executes in the composable system with the newly mapped device.

The method of FIG. 5 differs from the method of FIG. 3, however, in that exchanging (306), transparent to the workload executing in the composable system, the mapping for the device with the needed firmware update and the idle device in the resource pool includes updating (502) a pointer at an RDMA capable ethernet adapter from an address of the device with the needed firmware update to an address of the idle device, wherein the server device information remains unchanged.

The communication fabric may be RDMA capable ethernet with adapters for each device. The address for each device may be updated with a new address by updating a pointer in the RDMA capable ethernet adapter. The RDMA capable ethernet adapter may have memory with a table of pointers. A pointer in the RDMA capable ethernet adapter for an address of an idle device B (210B) is updated to be mapped to server (202) while a pointer in the RDMA capable ethernet adapter for the address of device A (210A) is also updated. The pointer in the RDMA capable ethernet adapter for address of device A (210A) may be updated to an unused address, an idle address, or a default address. Preferably, the pointers in the RDMA capable ethernet adapters for addresses for device A (210A) and device B (210B) are updated while device A (210A) is stable. Alternately, instructions or messages sent to device A (210A) are queued while the pointer for device B (210B) is updated. The change in mapping is transparent to the server (202) and workload (204). That is, workload (204) executes on server (202) using compute elements as required. The exchange of mapping from device A (210A) to device B (210B) happens transparently and without interrupting the execution of workload (204).

Figure 6:
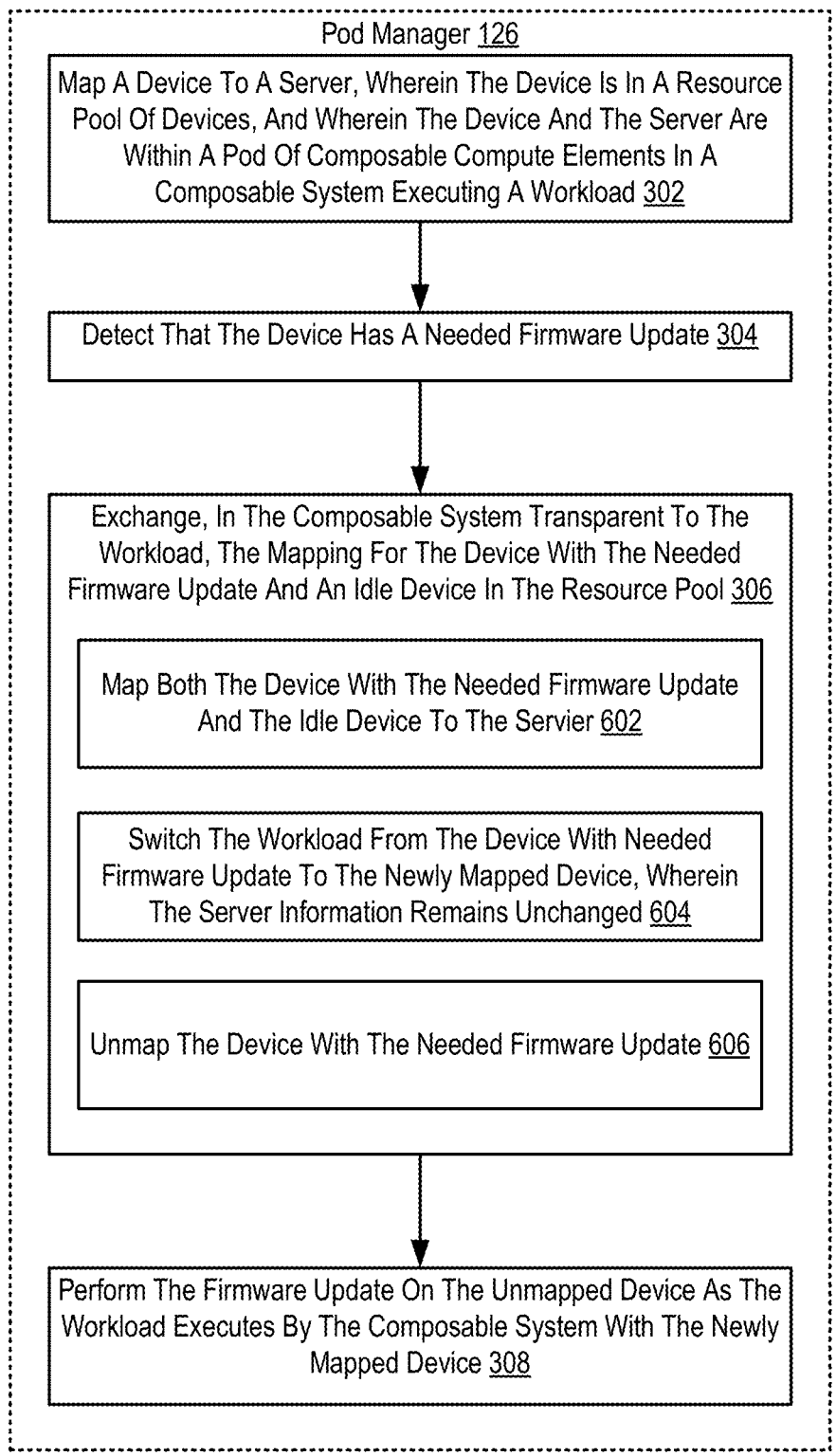
FIG. 6 sets forth a flow chart illustrating an exemplary method for managing composable compute system infrastructure with support for decoupled firmware updates according to embodiments of the present disclosure.

For further explanation, FIG. 6 sets forth a flow chart illustrating an exemplary method for managing composable compute system infrastructure with support for decoupled firmware updates according to embodiments of the present disclosure that includes mapping (302) a device to a server, wherein the device is in a resource pool of devices including at least one idle device, and wherein the device and the server are within a pod of composable compute elements connected by a fabric in a composable system executing a workload; detecting (304) that the device has a needed firmware update; exchanging (306), transparent to the workload executing in the composable system, the mapping for the device with the needed firmware update and the idle device in the resource pool; and performing (308) the firmware update on the unmapped device as the workload executes in the composable system with the newly mapped device.

The method of FIG. 6 differs from the method of FIG. 3, however, in that exchanging (306), transparent to the workload executing in the composable system, the mapping for the device with the needed firmware update and the idle device in the resource pool includes mapping (602) both the device with the needed firmware update and the idle device to the server. Mapping (602) both the device with the needed firmware update and the idle device to the server may be carried out by sending instructions from the pod manager (126) to the communication fabric or a controller or adapters in the communication fabric to update the address of device B (210B). That is, both device A (210A) and device B (210B) will have the same device address and both device A (210A) and device B (210B) will be mapped to server (202). Messages sent from server (202) will be sent to both device A (210A) and device B (210B).

The method of FIG. 6 also differs from the method of FIG. 3, in that exchanging (306), transparent to the workload executing in the composable system, the mapping for the device with the needed firmware update and the idle device in the resource pool includes switching (604) the workload from the device with the needed firmware update to the newly mapped device, wherein the server device information remains unchanged. Switching (604) the workload from the device with the needed firmware update to the newly mapped device, wherein the server device information remains unchanged may be carried out by pod manager (126) directing messages or instructions to device B (210B).

The method of FIG. 6 also differs from the method of FIG. 3, in that exchanging (306), transparent to the workload executing in the composable system, the mapping for the device with the needed firmware update and the idle device in the resource pool includes unmapping (606) the device with the needed firmware update. Unmapping (606) the device with the needed firmware update may be carried out by sending instructions from the pod manager (126) to the communication fabric or a controller or adapters in the communication fabric to update the address of device A (210A). The address of device A (210A) may be updated to an unused address, an idle address, or a default address.

For example, a server may be executing a workload that requires an accelerator. The pod manager maps the address of an idle accelerator while the server continues to send instructions to the current accelerator. Briefly, the server sends instructions to both accelerators, and then the pod manager transitions instructions to the new accelerator. When the new accelerator is phased in, the old accelerator address is unmapped.

Figure 7:
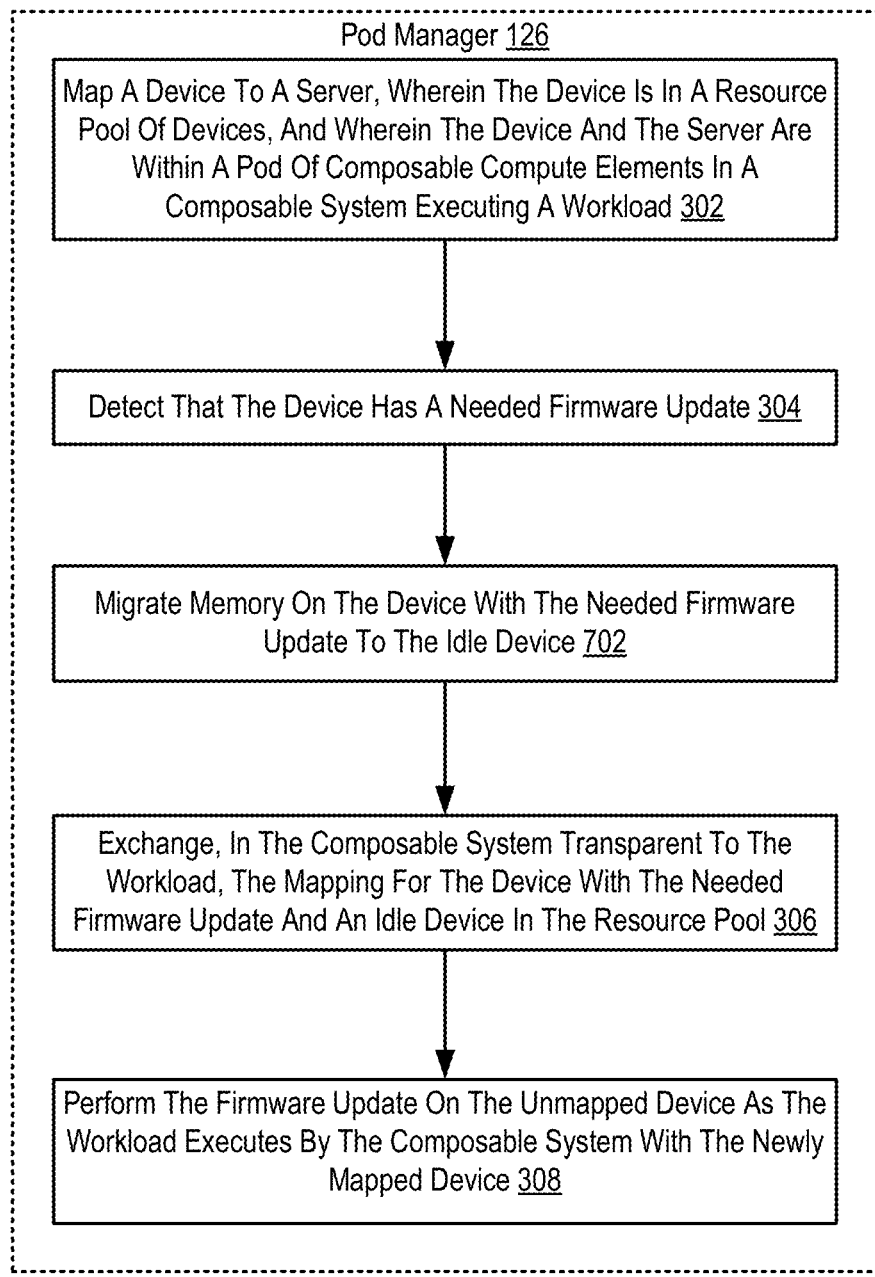
FIG. 7 sets forth a flow chart illustrating an exemplary method for managing composable compute system infrastructure with support for decoupled firmware updates according to embodiments of the present disclosure.

For further explanation, FIG. 7 sets forth a flow chart illustrating an exemplary method for managing composable compute system infrastructure with support for decoupled firmware updates according to embodiments of the present disclosure that includes mapping (302) a device to a server, wherein the device is in a resource pool of devices including at least one idle device, and wherein the device and the server are within a pod of composable compute elements connected by a fabric in a composable system executing a workload; detecting (304) that the device has a needed firmware update; exchanging (306), transparent to the workload executing in the composable system, the mapping for the device with the needed firmware update and the idle device in the resource pool; and performing (308) the firmware update on the unmapped device as the workload executes in the composable system with the newly mapped device.

The method of FIG. 7 differs from the method of FIG. 3, however, in that memory (702) on the device with the needed firmware update is migrated to the idle device prior to exchanging, transparent to the workload executing in the composable system, the mapping for the device with the needed firmware update and the idle device in the resource pool. Migrating (702) memory on the device with the needed firmware update to the idle device prior to exchanging, transparent to the workload executing in the composable system, the mapping for the device with the needed firmware update and the idle device in the resource pool may be carried out by pod manager (126) sending instructions to device A (210A) or the enclosure housing device A (210A) to copy or migrate data or memory to device B (210B). Alternatively, device A (210A) could initiate data or memory transfer to device B (device B) or server (202) or workload (205) could initiate data or memory transfer to device B (device B). For example, a data drive may have data used by workload (204) to be copied or migrated. An accelerator such as an FPGA or GPU may have memory to be copied or migrated.

In view of the explanations set forth above, readers will recognize that the benefits of managing composable compute system infrastructure with support for decoupled firmware updates according to embodiments of the present disclosure include:

Improving the operation of a computer system by avoiding system reboots during firmware updates, increasing system efficiency.

Improving the operation of a computer system by updating firmware without requiring maintenance scheduling, increasing system efficiency.

Improving the operation of a computer system by avoiding downtime or slowdowns during firmware updates, increasing system efficiency.

Exemplary embodiments of the present disclosure are described largely in the context of a fully functional computer system for managing composable compute system infrastructure with support for decoupled firmware updates. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
   by program instructions on a computing device,
   mapping a device to a server, wherein the device is in a resource pool of devices including at least one idle device, and wherein the device and the server are within a pod of composable compute elements connected by a fabric in a composable system executing a workload;
   detecting that the device has a needed firmware update;
   exchanging, transparent to the workload executing in the composable system, the mapping for the device with the needed firmware update and the idle device in the resource pool; and
   performing the firmware update on the unmapped device as the workload executes in the composable system with the newly mapped device.

2. The method of claim 1, further comprising:
   remapping, transparent to the workload executing in the composable system, the device with the updated firmware to the server, including exchanging, after performing the firmware update, the mapping for the newly updated device with the previously idle device; and
   returning the previously idle device to an idle state in the resource pool.

3. The method of claim 1, further comprising returning, after performing the updated on the device, the updated device to an idle state in the resource pool including updating an address to an idle address, wherein the previously idle device remains mapped to the server.

4. The method of claim 1, wherein the fabric connecting the device and server is a Remote Direct Memory Access (RDMA) capable network, and wherein exchanging, transparent to the workload executing in the composable system, the mapping for the device with the needed firmware update and the idle device in the resource pool comprises updating a pointer at an RDMA capable network adapter from an address of the device with the needed firmware update to an address of the idle device, wherein server device information remains unchanged.

5. The method of claim 1, wherein exchanging, transparent to the workload executing in the composable system, the mapping for the device with the needed firmware update and the idle device in the resource pool comprises:
   mapping both the device with the needed firmware update and the idle device to the server;
   switching the workload from the device with the needed firmware update to the newly mapped device, wherein server device information remains unchanged; and
   unmapping the device with the needed firmware update.

6. The method of claim 1, wherein the device with the needed firmware update is stable prior to exchanging, transparent to the workload executing in the composable system, the mapping for the device with the needed firmware update and the idle device in the resource pool.

7. The method of claim 1, wherein data stored in memory on the device with the needed firmware update is migrated to memory on the idle device prior to exchanging, transparent to the workload executing in the composable system, the mapping for the device with the needed firmware update and the idle device in the resource pool.

8. An apparatus comprising a computing device, a computer processor, and a computer memory operatively coupled to the computer processor, the computer memory storing computer program instructions that are configured to, when executed by the computer processor, cause the apparatus to perform operations comprising:
   mapping a device to a server, wherein the device is in a resource pool of devices including at least one idle device, and wherein the device and the server are within a pod of composable compute elements connected by a fabric in a composable system executing a workload;

detecting that the device has a needed firmware update;

exchanging, transparent to the workload executing in the composable system, the mapping for the device with the needed firmware update and the idle device in the resource pool; and performing the firmware update on the unmapped device as the workload executes in the composable system with the newly mapped device.

9. The apparatus of claim 8, wherein:

remapping, transparent to the workload executing in the composable system, the device with the updated firmware to the server, including exchanging, after performing the firmware update, the mapping for the newly updated device with the previously idle device; and returning the previously idle device to an idle state in the resource pool.

10. The apparatus of claim 8, further comprising returning, after performing the updated on the device, the updated device to an idle state in the resource pool including updating an address to an idle address, wherein the previously idle device remains mapped to the server.

11. The apparatus of claim 8, wherein the fabric connecting the device and server is a Remote Direct Memory Access (RDMA) capable network, and wherein exchanging, transparent to the workload executing in the composable system, the mapping for the device with the needed firmware update and the idle device in the resource pool comprises updating a pointer at an RDMA capable network adapter from an address of the device with the needed firmware update to an address of the idle device, wherein server device information remains unchanged.

12. The apparatus of claim 8, wherein exchanging, transparent to the workload executing in the composable system, the mapping for the device with the needed firmware update and the idle device in the resource pool comprises:

mapping both the device with the needed firmware update and the idle device to the server;

switching the workload from the device with the needed firmware update to the newly mapped device, wherein server device information remains unchanged; and unmapping the device with the needed firmware update.

13. The apparatus of claim 8, wherein the device with the needed firmware update is stable prior to exchanging, transparent to the workload executing in the composable system, the mapping for the device with the needed firmware update and the idle device in the resource pool.

14. The apparatus of claim 8, wherein data stored in memory on the device with the needed firmware update is migrated to memory on the idle device prior to exchanging, transparent to the workload executing in the composable system, the mapping for the device with the needed firmware update and the idle device in the resource pool.

15. A computer program product comprising a computer readable medium and computer program instructions stored therein that are configured to, when executed by a processor, cause a computer to perform operations comprising:

mapping a device to a server, wherein the device is in a resource pool of devices including at least one idle device, and wherein the device and the server are within a pod of composable compute elements connected by a fabric in a composable system executing a workload;

detecting that the device has a needed firmware update;

exchanging, transparent to the workload executing in the composable system, the mapping for the device with the needed firmware update and the idle device in the resource pool; and performing the firmware update on the unmapped device as the workload executes in the composable system with the newly mapped device.

16. The computer program product of claim 15, wherein:

remapping, transparent to the workload executing in the composable system, the device with the updated firmware to the server, including exchanging, after performing the firmware update, the mapping for the newly updated device with the previously idle device; and returning the previously idle device to an idle state in the resource pool.

17. The computer program product of claim 15, further comprising returning, after performing the updated on the device, the updated device to an idle state in the resource pool including updating an address to an idle address, wherein the previously idle device remains mapped to the server.

18. The computer program product of claim 15, wherein the fabric connecting the device and server is a Remote Direct Memory Access (RDMA) capable network, and wherein exchanging, transparent to the workload executing in the composable system, the mapping for the device with the needed firmware update and the idle device in the resource pool comprises updating a pointer at an RDMA capable network adapter from an address of the device with the needed firmware update to an address of the idle device, wherein server device information remains unchanged.

19. The computer program product of claim 15, wherein exchanging, transparent to the workload executing in the composable system, the mapping for the device with the needed firmware update and the idle device in the resource pool comprises:

mapping both the device with the needed firmware update and the idle device to the server;

switching the workload from the device with the needed firmware update to the newly mapped device, wherein server device information remains unchanged; and unmapping the device with the needed firmware update.

20. The computer program product of claim 15, wherein the device with the needed firmware update is stable prior to exchanging, transparent to the workload executing in the composable system, the mapping for the device with the needed firmware update and the idle device in the resource pool.

\* \* \* \* \*